United States Patent
Chen

(10) Patent No.: US 7,938,242 B2
(45) Date of Patent: May 10, 2011

(54) BICYCLE HUB THAT WILL NOT DRIVE THE PEDAL AND WILL NOT PRODUCE NOISE WHEN THE HUB IS ROTATED IN THE BACKWARD DIRECTION

(75) Inventor: Ching-Shu Chen, Changhua (TW)

(73) Assignee: Chosen Co., Ltd., Changhua Hsien (TW)

( * ) Notice: Subject to any disclaimer, the term of this patent is extended or adjusted under 35 U.S.C. 154(b) by 296 days.

(21) Appl. No.: 12/272,066

(22) Filed: Nov. 17, 2008

(65) Prior Publication Data

US 2010/0122886 A1    May 20, 2010

(51) Int. Cl.
*F16D 41/30* (2006.01)
(52) U.S. Cl. ............ 192/64; 192/46; 74/576; 301/110.5
(58) Field of Classification Search ....................... 192/64
See application file for complete search history.

(56) References Cited

U.S. PATENT DOCUMENTS

| | | | | |
|---|---|---|---|---|
| 756,086 A | * | 3/1904 | Weiler | 192/46 |
| 1,883,966 A | * | 10/1932 | Krause | 74/576 |
| 5,460,254 A | * | 10/1995 | Huang | 192/64 |
| 6,155,394 A | * | 12/2000 | Shook | 192/46 |
| 6,202,813 B1 | * | 3/2001 | Yahata et al. | 192/64 |

FOREIGN PATENT DOCUMENTS

JP          56-164232 A  * 12/1981

\* cited by examiner

*Primary Examiner* — Richard M. Lorence
(74) *Attorney, Agent, or Firm* — Alan Kamrath; Kamrath & Associates PA

(57) ABSTRACT

A hub for a bicycle includes a shaft, a hub body, a ratchet wheel, a damper, a drive seat, a plurality of pawl members, and a plurality of elastic plates. The ratchet wheel has a plurality of oneway ratchet teeth. The drive seat has a support base which has a plurality of receiving slots. Each of the pawl members has a locking detent. Thus, when the pedal is driven backward (and the drive seat is rotated backward), each of the pawl members is fully hidden in the respective receiving slot, and the locking detent of each of the pawl members is detached from the oneway ratchet teeth constantly, so that each of the pawl members will not touch the ratchet wheel when the pedal is driven backward to prevent from incurring a noise.

19 Claims, 11 Drawing Sheets

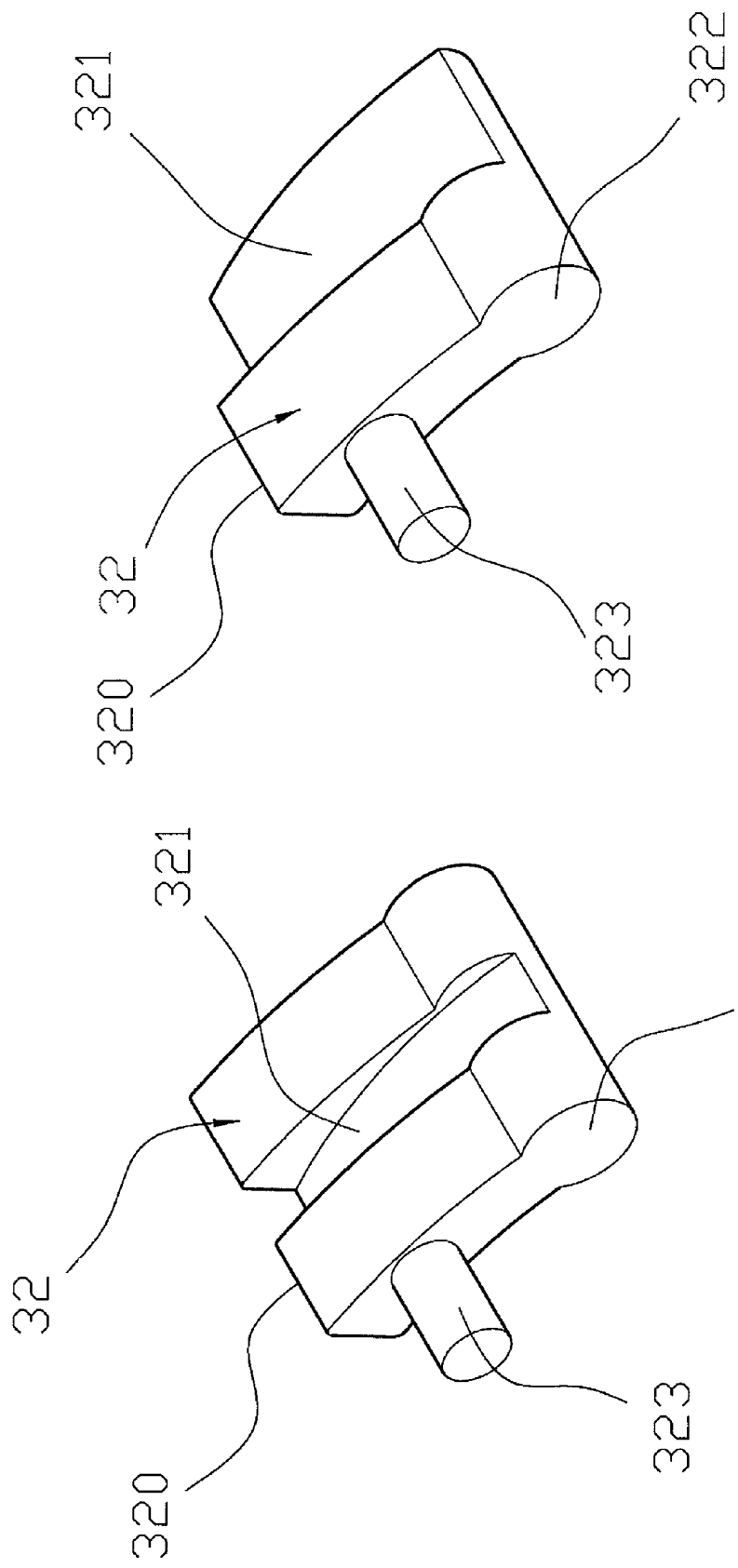

BICYCLE HUB THAT WILL NOT DRIVE THE PEDAL AND WILL NOT PRODUCE NOISE WHEN THE HUB IS ROTATED IN THE BACKWARD DIRECTION

BACKGROUND OF THE INVENTION

1. Field of the Invention

The present invention relates to a hub and, more particularly, to a ratchet hub for a bicycle.

2. Description of the Related Art

A conventional hub for a bicycle in accordance with the prior art shown in FIGS. 11 and 12 comprises a shaft 60, a hub body 50 rotatably mounted on the shaft 60, a ratchet wheel 51 secured in the hub body 50 to drive the hub body 50 to rotate relative to the shaft 60 and having an inside provided with a plurality of oneway ratchet teeth 511, a drive seat 40 rotatably mounted on the shaft 60 and having a first end provided with a support base 42 which is rotatable in the ratchet wheel 51 and has a periphery provided with a plurality of receiving slots 421, a plurality of pawl members 43 each pivotally mounted in a respective one of the receiving slots 421 of the support base 42 and each meshing with the oneway ratchet teeth 511 of the ratchet wheel 51 so that the ratchet wheel 51 is combined with and rotatable with the support base 42 of the drive seat 40, a plurality of elastic members 44 each biased between the support base 42 of the drive seat 40 and a respective one of the pawl members 43, at least one first bearing 62 and at least one bushing 63 mounted between the drive seat 40 and the shaft 60, and at least one second bearing 620 mounted between the hub body 50 and the shaft 60. The drive seat 40 has a second end provided with a sprocket 41.

In assembly, the hub body 50 is connected to a wheel (not shown) of the bicycle, the shaft 60 is connected to a frame (not shown) of the bicycle, the sprocket 41 of the drive seat 40 meshes with and is driven by a chain (not shown) which is driven by a chainwheel (not shown) which is driven by a pedal (not shown) that is pedalled by a rider.

In operation, when the pedal is pedalled by the rider to move forward, the chainwheel is driven by the pedal to drive the chain which drives the sprocket 41 of the drive seat 40 so as to rotate the drive seat 40 forward relative to the shaft 60, so that each of the pawl members 43 is rotatable forward with the support base 42 of the drive seat 40. At this time, each of the pawl members 43 meshes with the oneway ratchet teeth 511 of the ratchet wheel 51 so that the ratchet wheel 51 is driven by each of the pawl members 43 to drive the hub body 50 to rotate relative to the shaft 60 so as to move the wheel forward. On the contrary, when the pedal is pedalled by the rider to move backward, the chainwheel is driven by the pedal to drive the chain which drives the sprocket 41 of the drive seat 40 so as to rotate the drive seat 40 backward relative to the shaft 60, so that each of the pawl members 43 is rotatable backward with the support base 42 of the drive seat 40. At this time, each of the pawl members 43 passes by the oneway ratchet teeth 511 of the ratchet wheel 51 so that the ratchet wheel 51 is released from the oneway ratchet teeth 511 of the ratchet wheel 51. Thus, the ratchet wheel 51 together with the hub body 50 is not driven by the drive seat 40, and the drive seat 40 idles in the backward direction.

However, when each of the pawl members 43 passes by the one-way ratchet teeth 511 of the ratchet wheel 51 during the backward rotation of the drive seat 40, each of the pawl members 43 touches the oneway ratchet teeth 511 of the ratchet wheel 51 to produce noise due to the friction, thereby easily causing an uncomfortable sensation to the rider. In addition, when the hub body 50 is rotated in the backward direction (e.g., when the wheel is rotated backward by the rider), the ratchet wheel 51 is also rotated in the backward direction. At this time, each of the pawl members 43 meshes with the one-way ratchet teeth 511 of the ratchet wheel 51 so that the ratchet wheel 51 drives each of the pawl members 43 to drive the drive seat 40 to rotate relative to the shaft 60 in the backward direction. Thus, the pedal is driven by the drive seat 40 to rotate backward so that the rider is easily hit and hurt by the pedal, thereby causing danger to the rider.

BRIEF SUMMARY OF THE INVENTION

In accordance with the present invention, there is provided a hub for a bicycle, comprising a shaft, a hub body rotatably mounted on the shaft, a ratchet wheel secured in the hub body to drive the hub body to rotate relative to the shaft and having an inner wall provided with a plurality of oneway ratchet teeth, a damper mounted between the shaft and the hub body and having a periphery provided with a plurality of oblique guide slots, a drive seat rotatably mounted on the shaft and having a support base which is rotatable in the ratchet wheel and has a periphery provided with a plurality of receiving slots, and a plurality of pawl members each pivotally mounted in a respective one of the receiving slots of the support base of the drive seat and each having a side provided with a guide post which is movable in a respective one of the oblique guide slots of the damper to drive each of the pawl members to move between a first position where each of the pawl members meshes with the one-way ratchet teeth of the ratchet wheel so that the ratchet wheel is combined with and rotatable with the support base of the drive seat and a second position where each of the pawl members is detached from the oneway ratchet teeth of the ratchet wheel so that the ratchet wheel is released from and non-rotatable with the support base of the drive seat. The hub further comprises a plurality of elastic plates each pivotally mounted on the support base of the drive seat and each pressing a respective one of the pawl members to detach the respective pawl member from the oneway ratchet teeth of the ratchet wheel at a normal state.

The primary objective of the present invention is to provide a bicycle hub that will not drive the pedal and will not produce noise when the hub is rotated in the backward direction.

Another objective of the present invention is to provide a hub for a bicycle, wherein when the pedal is driven backward (and the drive seat is rotated backward), each of the pawl members is fully hidden in the respective receiving slot of the support base, and the locking detent of each of the pawl members is detached from the oneway ratchet teeth of the ratchet wheel constantly, so that each of the pawl members will not touch the ratchet wheel when the pedal is driven backward to prevent from incurring a noise when the pedal is driven backward.

A further objective of the present invention is to provide a hub for a bicycle, wherein when the pedal is driven backward, each of the pawl members is fully hidden in the respective receiving slot of the support base, and the locking detent of each of the pawl members is detached from the one-way ratchet teeth of the ratchet wheel constantly, so that the hub body is separated from the drive seat, and rotation of the hub body will not drive the drive seat and the pedal to prevent the pedal from being driven when the hub body is rotated backward.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 8 is a perspective view of a pawl member of the hub for a bicycle as shown in FIG. 2.

FIG. 9 is a perspective view of a pawl member of a hub for a bicycle in accordance with another preferred embodiment of the present invention.

DETAILED DESCRIPTION OF THE INVENTION

Figure 2:
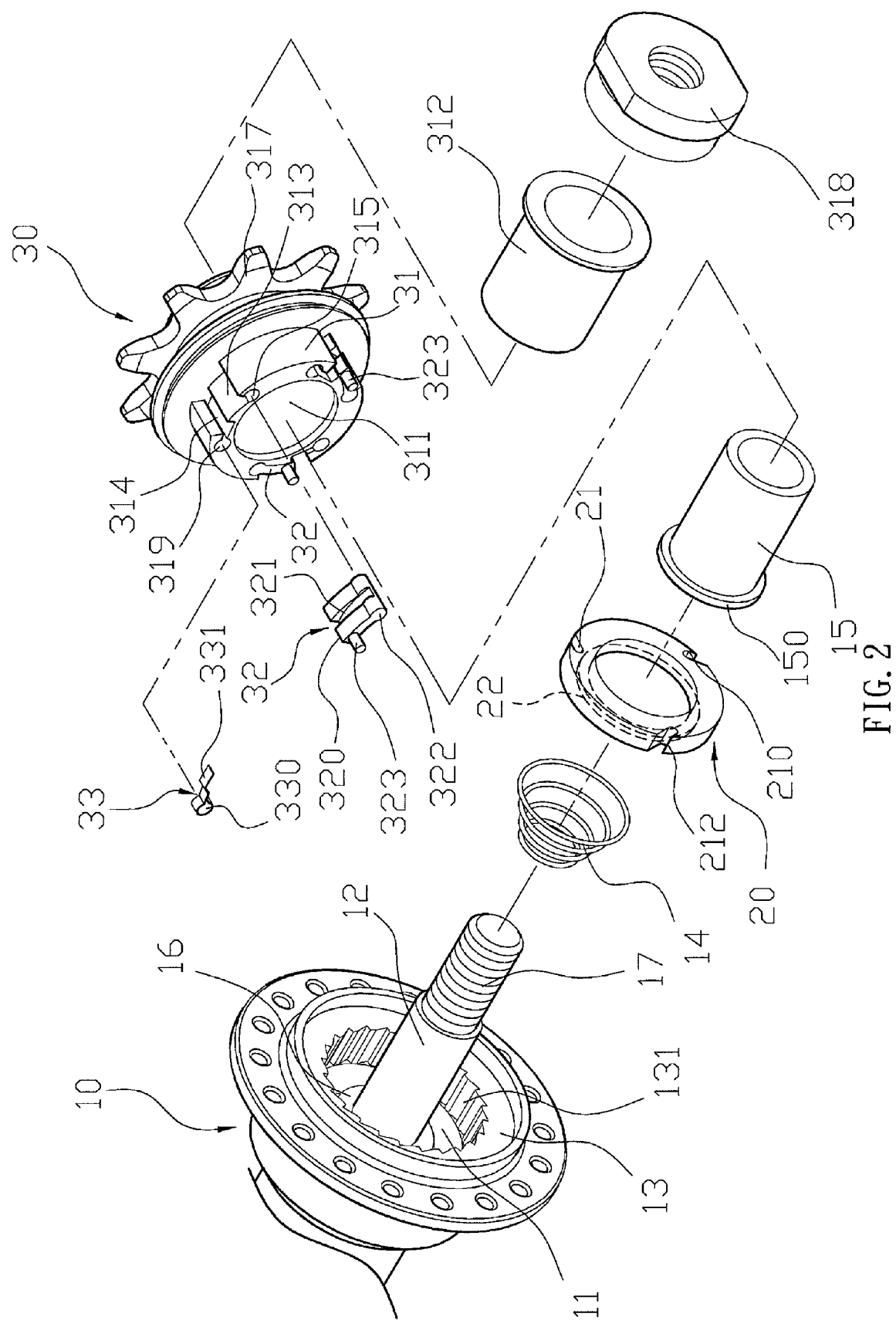
FIG. 2 is an exploded perspective view of the hub for a bicycle as shown in FIG. 1.
Figure 3:
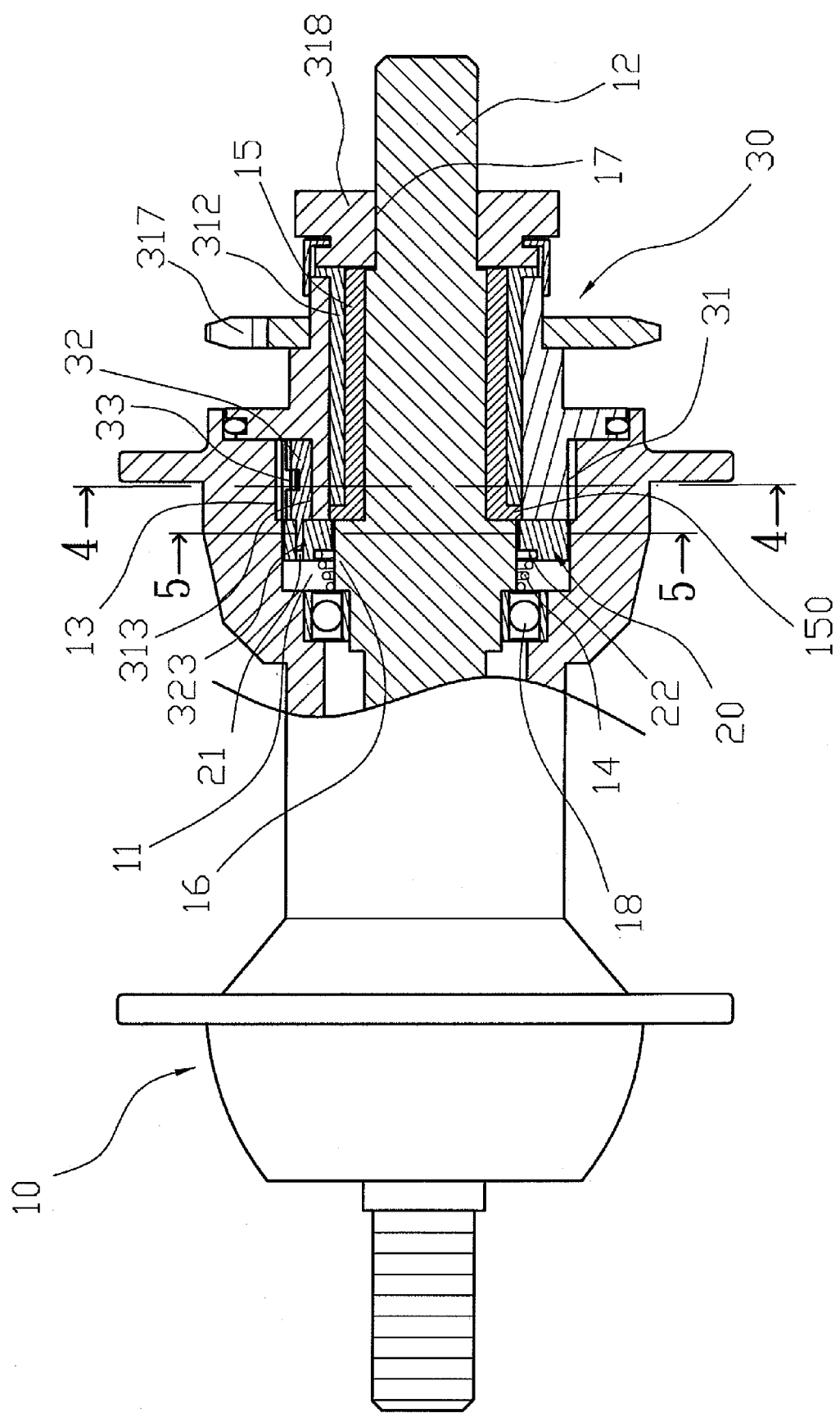
FIG. 3 is a partially front cross-sectional view of the hub for a bicycle as shown in FIG. 1.
Figure 4:
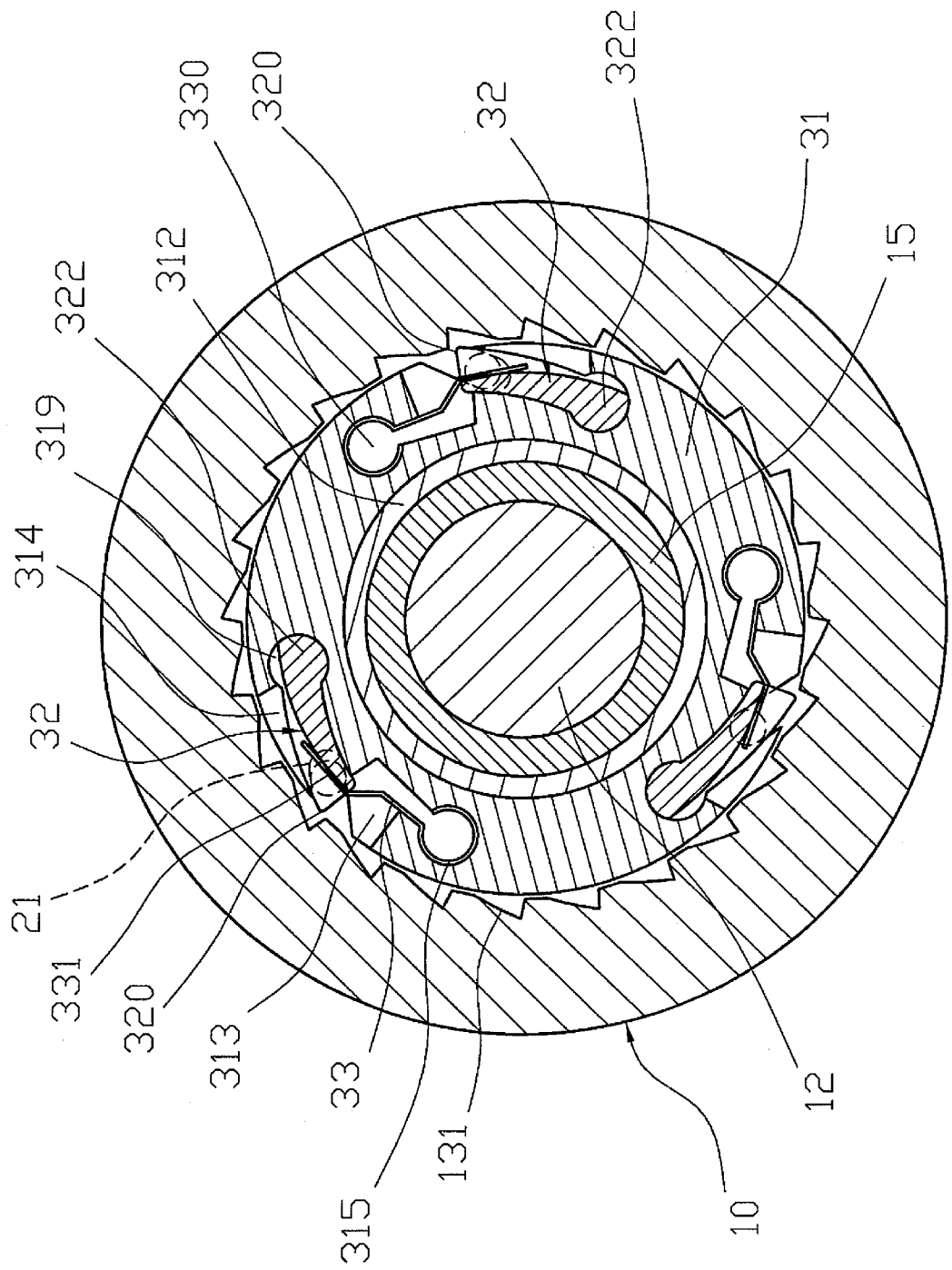
FIG. 4 is a cross-sectional view of the hub for a bicycle taken along line 4-4 as shown in FIG. 3.
Figure 5:
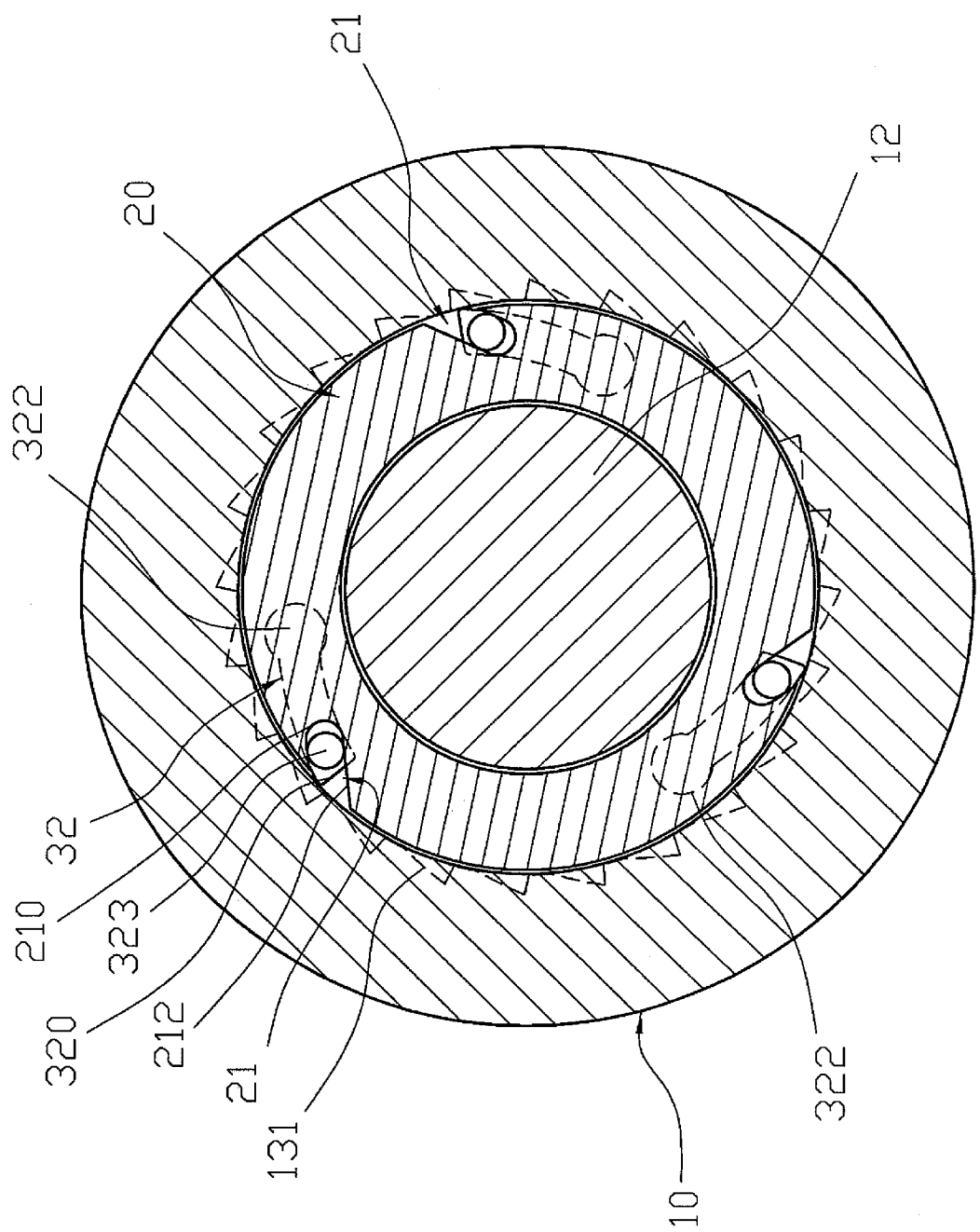
FIG. 5 is a cross-sectional view of the hub for a bicycle taken along line 5-5 as shown in FIG. 3.
Figure 6:
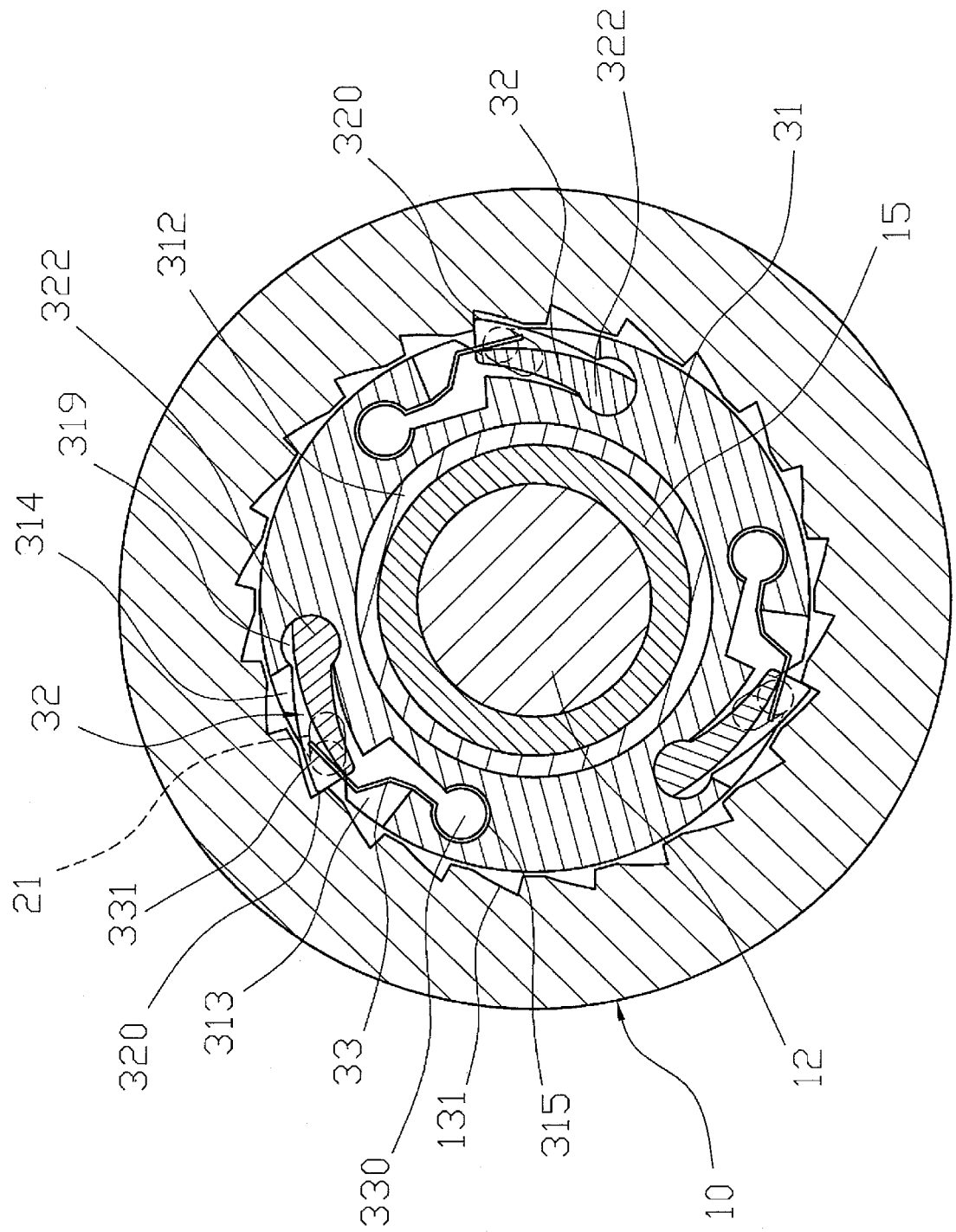
FIG. 6 is a schematic operational view of the hub for a bicycle as shown in FIG. 4.
Figure 7:
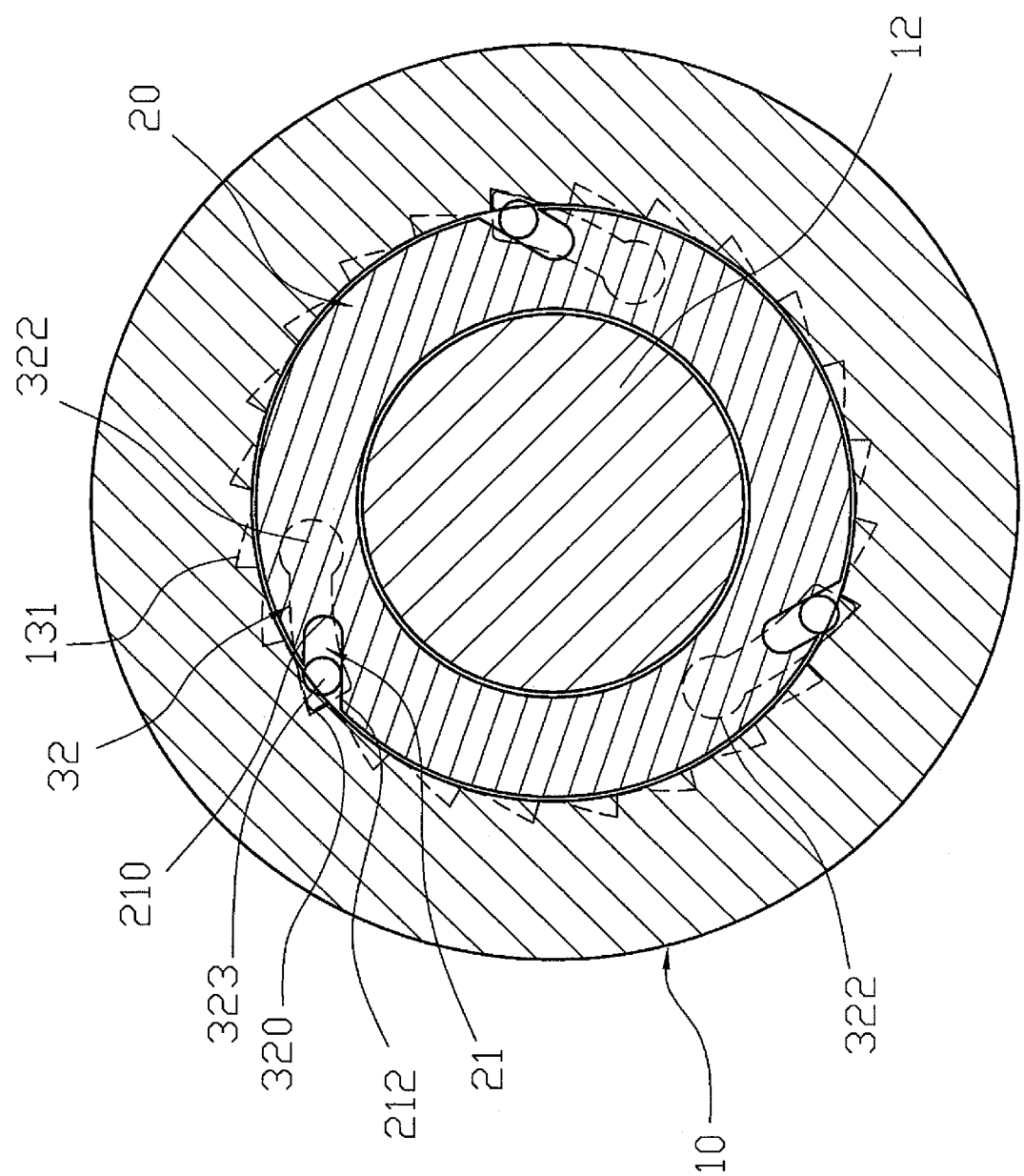
FIG. 7 is a schematic operational view of the hub for a bicycle as shown in FIG. 5.

Referring to the drawings and initially to FIGS. 1-5, a hub for a bicycle in accordance with the preferred embodiment of the present invention comprises a shaft 12, a hub body 10 rotatably mounted on the shaft 12, a ratchet wheel 13 secured in the hub body 10 to drive the hub body 10 to rotate relative to the shaft 12 and having an inner wall provided with a plurality of oneway ratchet teeth 131, a damper 20 mounted between the shaft 12 and the hub body 10 and having a periphery provided with a plurality of oblique guide slots 21, a drive seat 30 rotatably mounted on the shaft 12 and having a support base 31 which is rotatable in the ratchet wheel 13 and has a periphery provided with a plurality of receiving slots 313, a plurality of pawl members 32 each pivotally mounted in a respective one of the receiving slots 313 of the support base 31 of the drive seat 30 and each having a side provided with a guide post 323 which is movable in a respective one of the oblique guide slots 21 of the damper 20 to drive each of the pawl members 32 to move between a first position as shown in FIGS. 6 and 7 where each of the pawl members 32 meshes with the oneway ratchet teeth 131 of the ratchet wheel 13 so that the ratchet wheel 13 is combined with and rotatable with the support base 31 of the drive seat 30 and a second position as shown in FIGS. 4 and 5 where each of the pawl members 32 is detached from the oneway ratchet teeth 131 of the ratchet wheel 13 so that the ratchet wheel 13 is released from and non-rotatable with the support base 31 of the drive seat 30, and a plurality of elastic plates 33 each pivotally mounted on the support base 31 of the drive seat 30 and each pressing a respective one of the pawl members 32 to detach the respective pawl member 32 from the oneway ratchet teeth 131 of the ratchet wheel 13 at a normal state.

The drive seat 30 has a central portion provided with a shaft hole 311. The drive seat 30 has a first end provided with the support base 31 and a second end provided with a sprocket 317. The support base 31 of the drive seat 30 has a substantially cylindrical shape and abuts the damper 20 so that the damper 20 is located between the hub body 10 and the support base 31 of the drive seat 30. Each of the receiving slots 313 of the support base 31 has an oblique shape and has a bottom provided with a pivot hole 315. The periphery of the support base 31 is provided with a plurality of retaining grooves 314 each facing a respective one of the receiving slots 313 to receive a respective one of the elastic plates 33. Each of the retaining grooves 314 of the support base 31 has an oblique shape and has a bottom provided with a pivot bore 319.

Each of the pawl members 32 has an oblique shape and has a peripheral wall provided with a limit groove 321 to receive the respective elastic plate 33. Each of the pawl members 32 is rotatable with the support base 31 of the drive seat 30 and is rotatable relative to the damper 20 and the shaft 12. Each of the pawl members 32 has a first end provided with an enlarged pivot fulcrum 322 pivotally mounted in the pivot hole 315 of the respective receiving slot 313 of the support base 31 and a second end provided with a locking detent 320 which is movable with the guide post 323 to mesh with or detach from the oneway ratchet teeth 131 of the ratchet wheel 13. The second end of each of the pawl members 32 is provided with the guide post 323.

Each of the elastic plates 33 is pivotally mounted in a respective one of the retaining grooves 314 of the support base 31 and has a first end provided with an enlarged pivot portion 330 pivotally mounted in the pivot bore 319 of the respective retaining groove 314 of the support base 31 and a second end provided with a pressing portion 331 which presses the locking detent 320 of the respective pawl member 32 and is received in the limit groove 321 of the respective pawl member 32.

The hub body 10 has an inner wall provided with a stepped receiving chamber 11 located beside the ratchet wheel 13 to receive the damper 20. The shaft 12 has a mediate portion provided with an enlarged stop ring 16 and has two opposite ends each provided with an outer thread 17.

The hub further comprises a biasing member 14 mounted on the stop ring 16 of the shaft 12 and biased between the hub body 10 and the damper 20 to push the damper 20 toward the support base 31 of the drive seat 30, a bearing 18 mounted in the receiving chamber 11 of the hub body 10 and located between the hub body 10 and the biasing member 14 so that the biasing member 14 is biased between the bearing 18 and the damper 20, a positioning bushing 15 mounted between the shaft 12 and the drive seat 30 and having an enlarged first end 150 abutting the stop ring 16 of the shaft 12 and the damper 20, a self-lubricating bearing 312 mounted between the positioning bushing 15 and the drive seat 30, and a locking nut screwed onto the respective outer thread 17 of the shaft 12 and abutting a second end of the positioning bushing 15 and the self-lubricating bearing 312. The positioning bushing 15 and the self-lubricating bearing 312 are mounted in the shaft hole 311 of the drive seat 30.

The damper 20 has a ring shape and is frictionally mounted on the stop ring 16 of the shaft 12. The damper 20 has an outer diameter smaller than an inner diameter of the ratchet wheel 13. The damper 20 has a side provided with a retaining recess 22 for retaining the biasing member 14. Each of the oblique guide slots 21 of the damper 20 has an inner side 210 and an outer side 212, wherein the inner side 210 is located between the shaft 12 and the outer side 212, and the outer side 212 is located between the inner side 210 and the oneway ratchet teeth 131 of the ratchet wheel 13.

In assembly, the hub body 10 is connected to a wheel (not shown) of the bicycle, the shaft 12 is connected to a frame (not shown) of the bicycle, the sprocket 317 of the drive seat 30 meshes with and is driven by a chain (not shown) which is driven by a chainwheel (not shown) which is driven by a pedal (not shown) that is pedalled by a rider.

Figure 1:
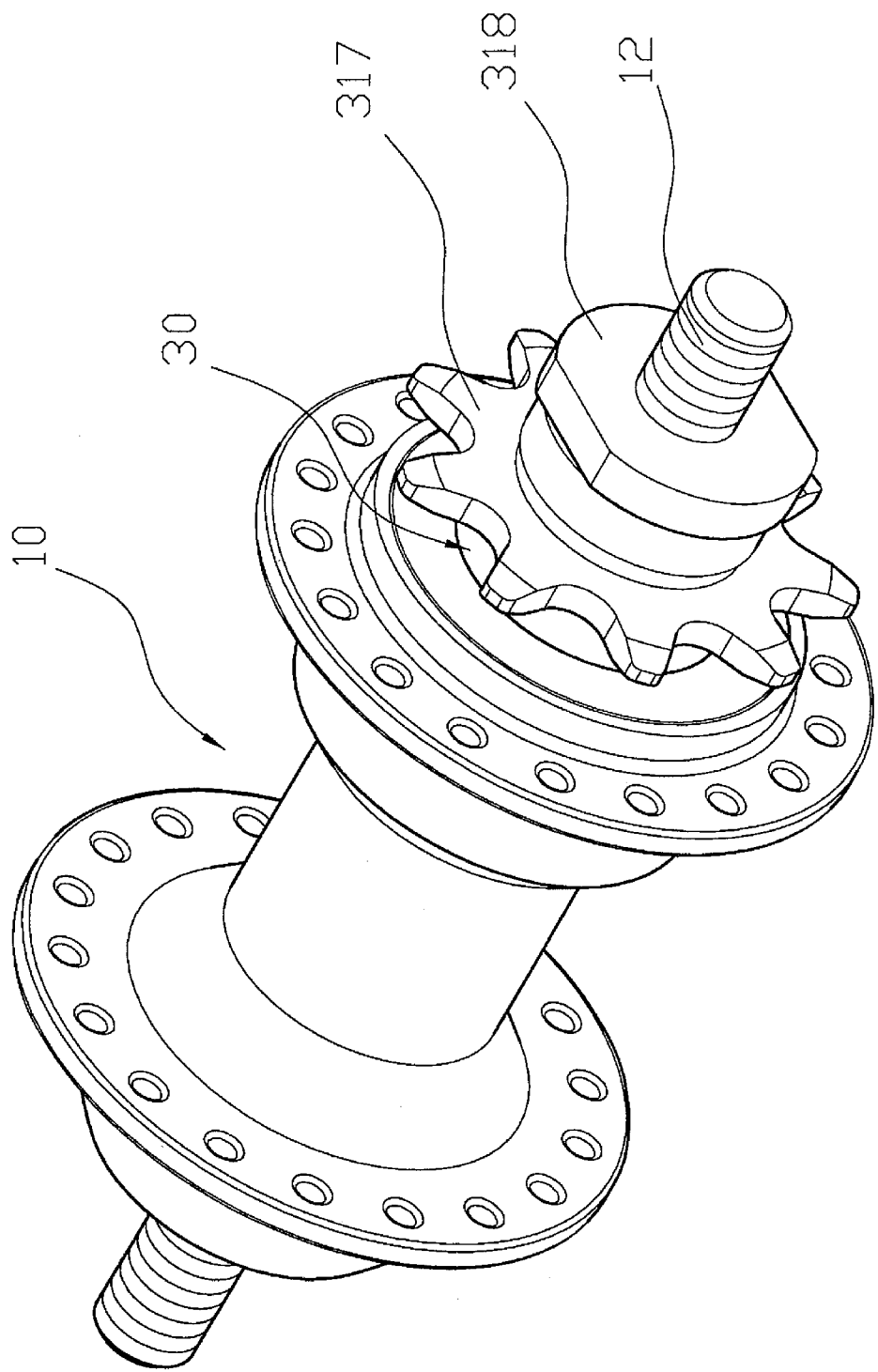
FIG. 1 is a perspective view of a hub for a bicycle in accordance with the preferred embodiment of the present invention.

In operation, referring to FIGS. 4-7 with reference to FIGS. 1-3, each of the pawl members 32 is pressed by the respective elastic plate 33 as shown in FIG. 4 to detach from the oneway ratchet teeth 131 of the ratchet wheel 13, so that the ratchet wheel 13 is released from and non-rotatable with the support base 31 of the drive seat 30 at a normal state. At this time, the guide post 323 of each of the pawl members 32 is located at the inner side 210 of the respective guide slot 21 of the damper 20 as shown in FIG. 5.

In such a manner, when the pedal is pedalled by the rider to move forward, the chainwheel is driven by the pedal to drive the chain which drives the sprocket 317 of the drive seat 30 so as to rotate the drive seat 30 forward relative to the shaft 12, so that each of the pawl members 32 is rotatable with the support base 31 of the drive seat 30 and is rotatable relative to the damper 20 and the shaft 12, and the guide post 323 of each of the pawl members 32 is also movable relative to the damper 20. At this time, the guide post 323 of each of the pawl members 32 is limited in the respective guide slot 21 of the damper 20, and the damper 20 is temporarily positioned on the stop ring 16 of the shaft 12 by the biasing member 14 to provide a resistance to the guide post 323 of each of the pawl members 32, so that the guide post 323 of each of the pawl members 32 is movable in the respective guide slot 21 of the damper 20 toward the outer side 212 of the respective guide slot 21 as shown in FIG. 7 to drive each of the pawl members 32 to pivot outwardly relative to the respective receiving slot 313 of the support base 31, and the locking detent 320 of each of the pawl members 32 is movable outwardly relative to the respective receiving slot 313 of the support base 31 to mesh with the oneway ratchet teeth 131 of the ratchet wheel 13 as shown in FIG. 6. Thus, the ratchet wheel 13 is combined with and rotatable with the support base 31 of the drive seat 30, so that the ratchet wheel 13 is driven by the drive seat 30 to drive the hub body 10 to rotate relative to the shaft 12 so as to move the wheel forward. At this time, the damper 20 is driven by the guide post 323 of each of the pawl members 32 when the force applied by the drive seat 30 is greater than the friction between the damper 20 and the stop ring 16 of the shaft 12, so that the damper 20 is also rotatable with the drive seat 30 to rotate relative to the shaft 12.

On the contrary, when the pedal is pedalled by the rider to move backward, the chainwheel is driven by the pedal to drive the chain which drives the sprocket 317 of the drive seat 30 so as to rotate the drive seat 30 backward relative to the shaft 12, so that each of the pawl members 32 is rotatable with the support base 31 of the drive seat 30 and is rotatable relative to the damper 20 and the shaft 12. At this time, the guide post 323 of each of the pawl members 32 is limited in the respective guide slot 21 of the damper 20, and the damper 20 is temporarily positioned on the stop ring 16 of the shaft 12 by the biasing member 14 to provide a resistance to the guide post 323 of each of the pawl members 32, so that the guide post 323 of each of the pawl members 32 is movable in the respective guide slot 21 of the damper 20 toward the inner side 210 of the respective guide slot 21 as shown in FIG. 5 to drive each of the pawl members 32 to pivot inwardly relative to and retract into the respective receiving slot 313 of the support base 31, and the locking detent 320 of each of the pawl members 32 is movable inwardly relative to the respective receiving slot 313 of the support base 31 to detach from the oneway ratchet teeth 131 of the ratchet wheel 13 as shown in FIG. 4. Thus, the ratchet wheel 13 is released from and not rotatable with the support base 31 of the drive seat 30, so that the ratchet wheel 13 together with the hub body 10 is not driven by the drive seat 30, and the drive seat 30 idles. At this time, the damper 20 is driven by the guide post 323 of each of the pawl members 32 when the force applied by the drive seat 30 is greater than the friction between the damper 20 and the stop ring 16 of the shaft 12, so that the damper 20 is rotatable with the drive seat 30 to rotate relative to the shaft 12.

Thus, when the pedal is driven backward (and the drive seat 30 is rotated backward), each of the pawl members 32 is fully hidden in the respective receiving slot 313 of the support base 31, and the locking detent 320 of each of the pawl members 32 is detached from the oneway ratchet teeth 131 of the ratchet wheel 13 constantly, so that each of the pawl members 32 will not touch the ratchet wheel 13 when the pedal is driven backward to prevent from incurring a noise when the pedal is driven backward. In addition, when the pedal is driven backward, each of the pawl members 32 is fully hidden in the respective receiving slot 313 of the support base 31, and the locking detent 320 of each of the pawl members 32 is detached from the oneway ratchet teeth 131 of the ratchet wheel 13 constantly, so that the hub body 10 is separated from the drive seat 30, and rotation of the hub body 10 will not drive the drive seat 30 and the pedal to prevent the pedal from being driven when the hub body 10 is rotated backward.

Referring to FIG. 8, the limit groove 321 of each of the pawl members 32 is located at a middle position of each of the pawl members 32.

Referring to FIG. 9, the limit groove 321 of each of the pawl members 32 is located at a side of each of the pawl members 32.

Figure 10:
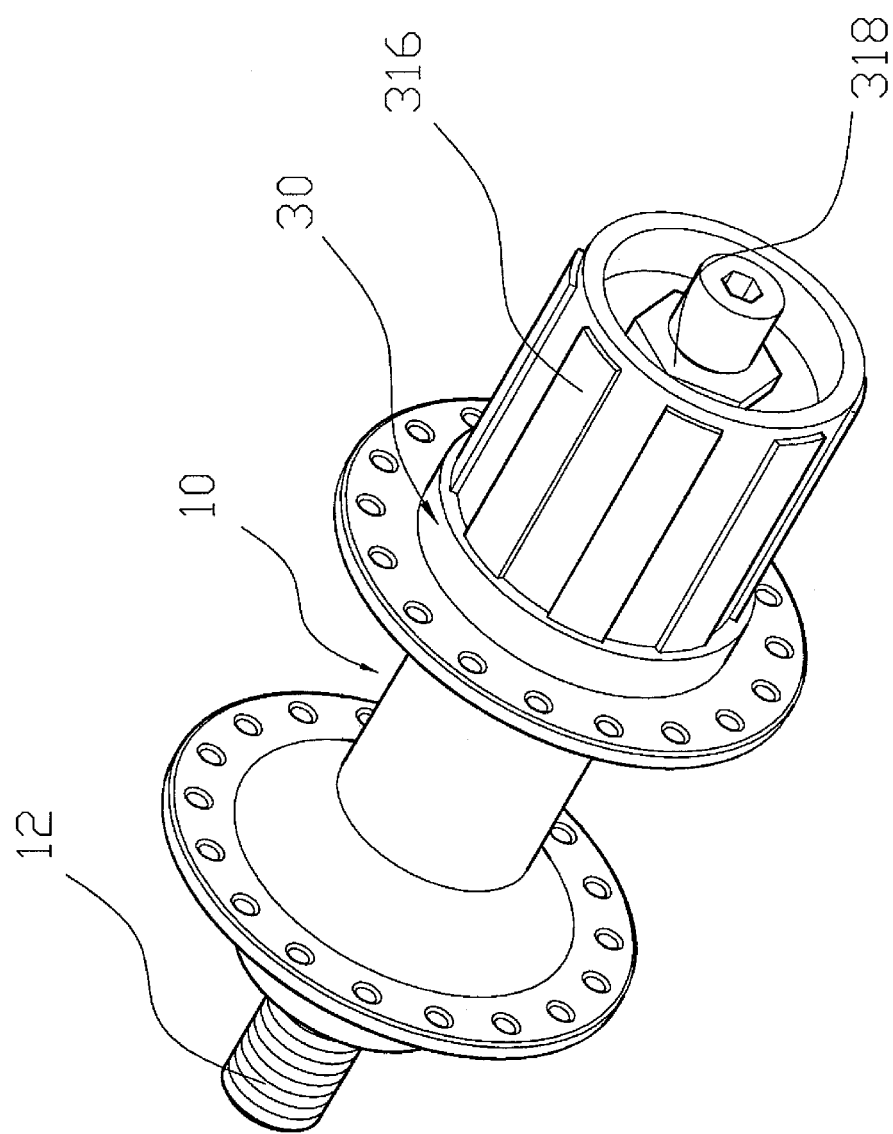
FIG. 10 is a perspective view of a hub for a bicycle in accordance with another preferred embodiment of the present invention.
Figure 11:
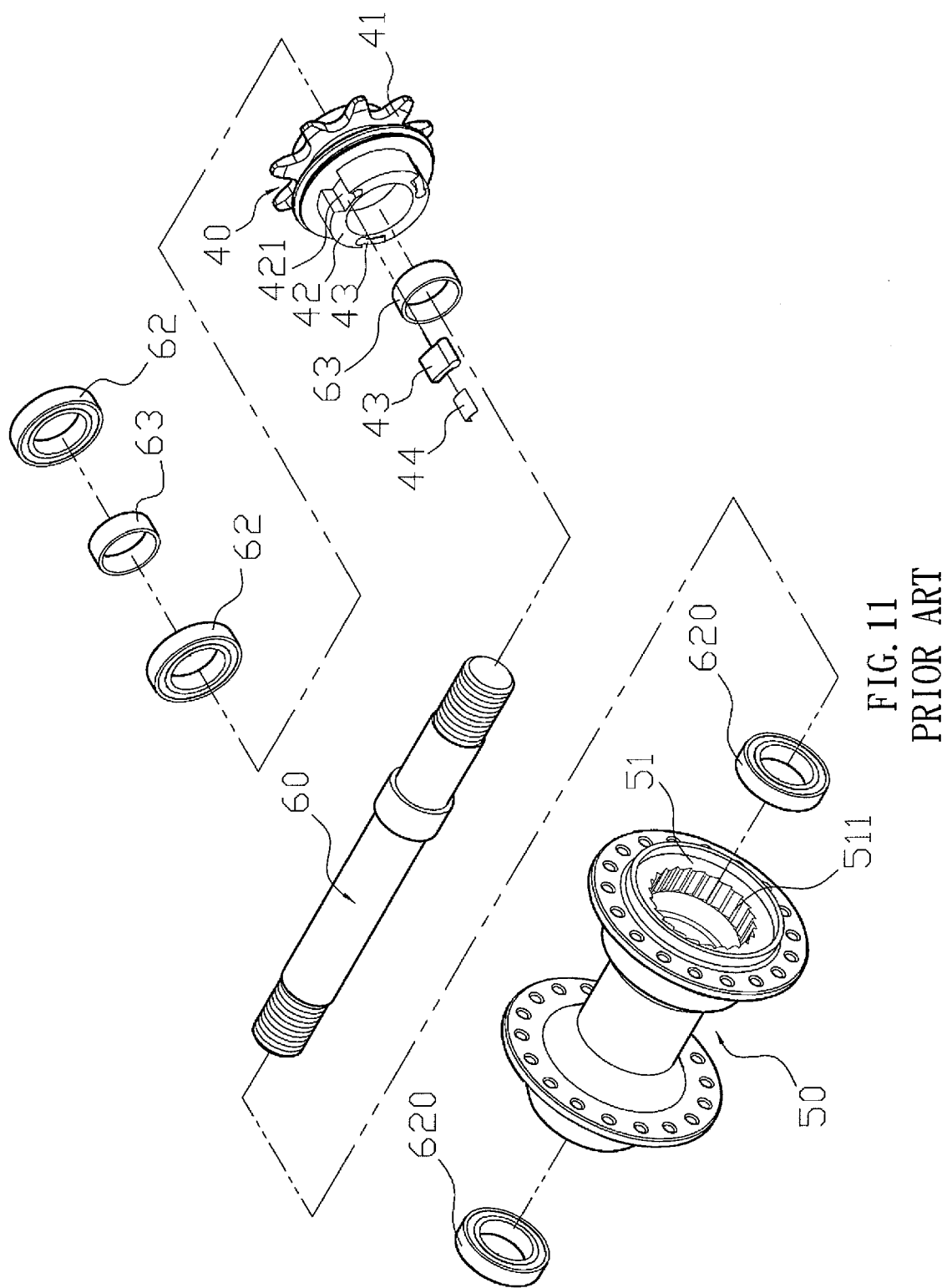
FIG. 11 is an exploded perspective view of a conventional hub for a bicycle in accordance with the prior art.
Figure 12:
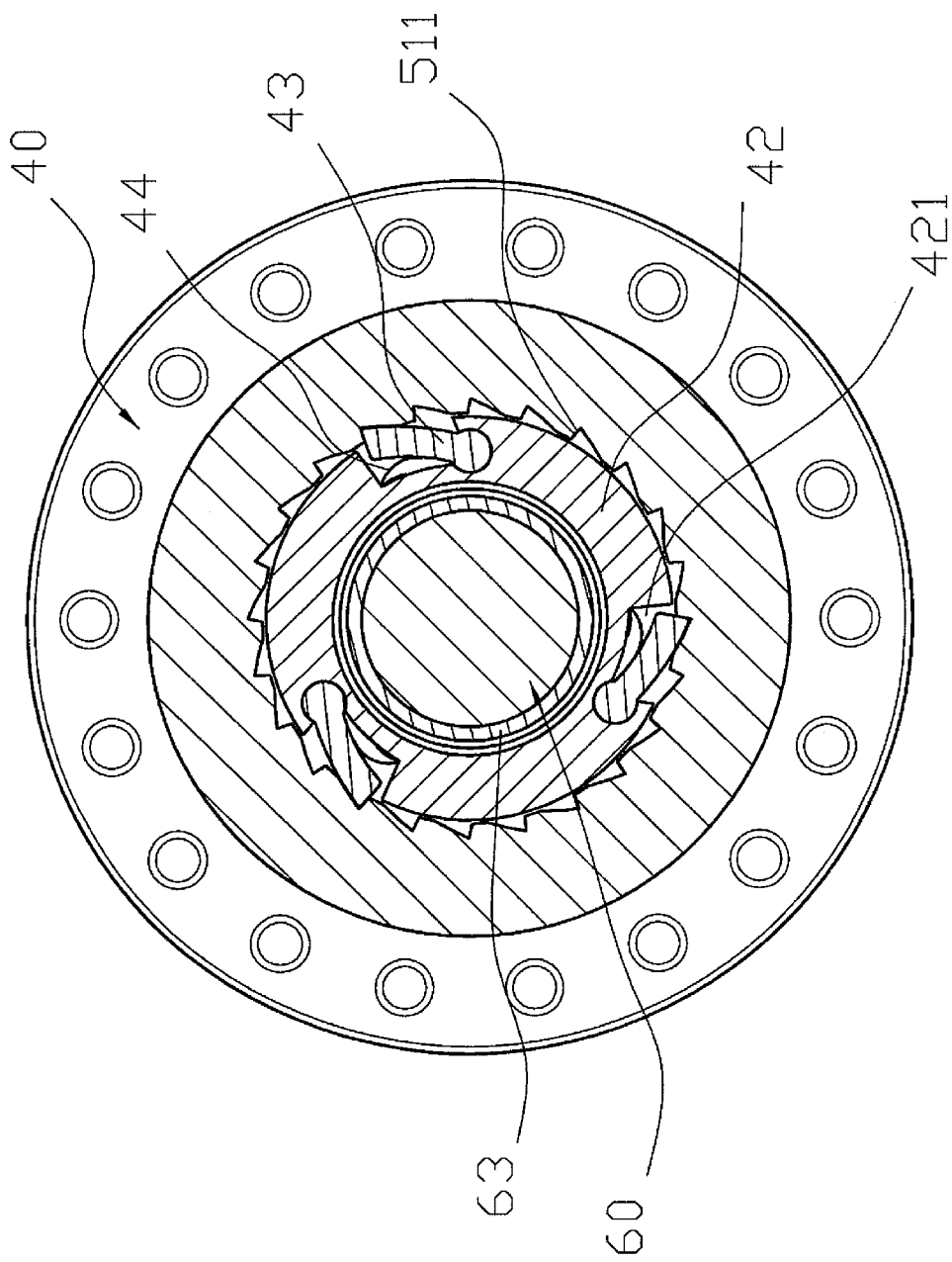
FIG. 12 is a side cross-sectional assembly view of the conventional hub for a bicycle as shown in FIG. 11.

Referring to FIG. 10, the drive seat 30 has a second end provided with a tubular freewheel 316.

Accordingly, when the pedal is driven backward (and the drive seat 30 is rotated backward), each of the pawl members 32 is fully hidden in the respective receiving slot 313 of the support base 31, and the locking detent 320 of each of the pawl members 32 is detached from the oneway ratchet teeth 131 of the ratchet wheel 13 constantly, so that each of the pawl members 32 will not touch the ratchet wheel 13 when the pedal is driven backward to prevent from incurring a noise when the pedal is driven backward. In addition, when the pedal is driven backward, each of the pawl members 32 is fully hidden in the respective receiving slot 313 of the support base 31, and the locking detent 320 of each of the pawl members 32 is detached from the oneway ratchet teeth 131 of the ratchet wheel 13 constantly, so that the hub body 10 is separated from the drive seat 30, and rotation of the hub body 10 will not drive the drive seat 30 and the pedal to prevent the pedal from being driven when the hub body 10 is rotated backward.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A hub for a bicycle, comprising:
a shaft;
a hub body rotatably mounted on the shaft;
a ratchet wheel secured in the hub body to drive the hub body to rotate relative to the shaft and having an inner wall provided with a plurality of oneway ratchet teeth;

a damper mounted between the shaft and the hub body and having a periphery provided with a plurality of oblique guide slots;

a drive seat rotatably mounted on the shaft and having a support base which is rotatable in the ratchet wheel and has a periphery provided with a plurality of receiving slots;

a plurality of pawl members each pivotally mounted in a respective one of the receiving slots of the support base of the drive seat and each having a side provided with a guide post which is movable in a respective one of the oblique guide slots of the damper to drive each of the pawl members to move between a first position where each of the pawl members meshes with the oneway ratchet teeth of the ratchet wheel so that the ratchet wheel is combined with and rotatable with the support base of the drive seat and a second position where each of the pawl members is detached from the oneway ratchet teeth of the ratchet wheel so that the ratchet wheel is released from and non-rotatable with the support base of the drive seat;

a plurality of elastic plates each pivotally mounted on the support base of the drive seat and each pressing a respective one of the pawl members to detach the respective pawl member from the oneway ratchet teeth of the ratchet wheel at a normal state.

2. The hub for a bicycle of claim 1, wherein each of the receiving slots of the support base has a bottom provided with a pivot hole;

each of the pawl members has a first end provided with an enlarged pivot fulcrum pivotally mounted in the pivot hole of the respective receiving slot of the support base and a second end provided with a locking detent which is movable with the guide post to mesh with or detach from the oneway ratchet teeth of the ratchet wheel.

3. The hub for a bicycle of claim 2, wherein the second end of each of the pawl members is provided with the guide post.

4. The hub for a bicycle of claim 2, wherein the periphery of the support base is provided with a plurality of retaining grooves each facing a respective one of the receiving slots to receive a respective one of the elastic plates;

each of the elastic plates is pivotally mounted in a respective one of the retaining grooves of the support base.

5. The hub for a bicycle of claim 4, wherein each of the retaining grooves of the support base has a bottom provided with a pivot bore;

each of the elastic plates has a first end provided with an enlarged pivot portion pivotally mounted in the pivot bore of the respective retaining groove of the support base and a second end provided with a pressing portion which presses the locking detent of the respective pawl member.

6. The hub for a bicycle of claim 5, wherein each of the pawl members has a peripheral wall provided with a limit groove to receive the respective elastic plate;

the pressing portion of each of the elastic plates is received in the limit groove of the respective pawl member.

7. The hub for a bicycle of claim 6, wherein the limit groove of each of the pawl members is located at a middle position of each of the pawl members.

8. The hub for a bicycle of claim 6, wherein the limit groove of each of the pawl members is located at a side of each of the pawl members.

9. The hub for a bicycle of claim 4, wherein each of the retaining grooves of the support base has an oblique shape.

10. The hub for a bicycle of claim 2, wherein each of the oblique guide slots of the damper has an inner side and an outer side;

the inner side of each of the oblique guide slots is located between the shaft and the outer side of each of the oblique guide slots;

the outer side each of the oblique guide slots is located between the inner side of each of the oblique guide slots and the oneway ratchet teeth of the ratchet wheel.

11. The hub for a bicycle of claim 10, wherein when the locking detent of each of the pawl members is movable to detach from the oneway ratchet teeth of the ratchet wheel, the guide post of each of the pawl members is located at the inner side of the respective guide slot of the damper;

when the locking detent of each of the pawl members is movable to mesh with the oneway ratchet teeth of the ratchet wheel, the guide post of each of the pawl members is located at the outer side of the respective guide slot of the damper.

12. The hub for a bicycle of claim 1, wherein the drive seat has a first end provided with the support base and a second end provided with a sprocket.

13. The hub for a bicycle of claim 1, wherein the hub body has an inner wall provided with a stepped receiving chamber located beside the ratchet wheel to receive the damper;

each of the pawl members is rotatable with the support base of the drive seat and is rotatable relative to the damper and the shaft.

14. The hub for a bicycle of claim 1, wherein each of the receiving slots of the support base has an oblique shape;

each of the pawl members has an oblique shape.

15. A hub for a bicycle, comprising:

a shaft;

a hub body rotatably mounted on the shaft;

a ratchet wheel secured in the hub body to drive the hub body to rotate relative to the shaft and having an inner wall provided with a plurality of oneway ratchet teeth;

a damper mounted between the shaft and the hub body and having a periphery provided with a plurality of oblique guide slots;

a drive seat rotatably mounted on the shaft and having a support base which is rotatable in the ratchet wheel and has a periphery provided with a plurality of receiving slots;

a plurality of pawl members each pivotally mounted in a respective one of the receiving slots of the support base of the drive seat and each having a side provided with a guide post which is movable in a respective one of the oblique guide slots of the damper to drive each of the pawl members to move between a first position where each of the pawl members meshes with the oneway ratchet teeth of the ratchet wheel so that the ratchet wheel is combined with and rotatable with the support base of the drive seat and a second position where each of the pawl members is detached from the oneway ratchet teeth of the ratchet wheel so that the ratchet wheel is released from and non-rotatable with the support base of the drive seat; wherein:

the shaft has a mediate portion provided with an enlarged stop ring and has two opposite ends each provided with an outer thread;

the hub further comprises:

a biasing member mounted on the stop ring of the shaft and biased between the hub body and the damper to push the damper toward the support base of the drive seat;

a positioning bushing mounted between the shaft and the drive seat and having an enlarged first end abutting the stop ring of the shaft and the damper;

a self-lubricating bearing mounted between the positioning bushing and the drive seat;

a locking nut screwed onto the respective outer thread of the shaft and abutting a second end of the positioning bushing and the self-lubricating bearing.

16. The hub for a bicycle of claim 15, further comprising:

a bearing mounted in the receiving chamber of the hub body and located between the hub body and the biasing member;

wherein the biasing member is biased between the bearing and the damper.

17. The hub for a bicycle of claim 15, wherein the damper has a side provided with a retaining recess for retaining the biasing member.

18. The hub for a bicycle of claim 15, wherein the drive seat has a central portion provided with a shaft hole;

the positioning bushing and the self-lubricating bearing are mounted in the shaft hole of the drive seat.

19. The hub for a bicycle of claim 15, wherein the damper has a ring shape and is frictionally mounted on the stop ring of the shaft;

the damper has an outer diameter smaller than an inner diameter of the ratchet wheel;

the support base of the drive seat has a substantially cylindrical shape and abuts the damper;

the damper is located between the hub body and the support base of the drive seat.

* * * * *